United States Patent
Nassar et al.

(10) Patent No.: US 10,046,394 B2
(45) Date of Patent: Aug. 14, 2018

(54) METHOD FOR MANUFACTURING OVERHANGING MATERIAL BY PULSED, VOXEL-WISE BUILDUP

(71) Applicant: The Penn State Research Foundation, University Park, PA (US)

(72) Inventors: Abdalla R. Nassar, University Park, PA (US); Edward W. Reutzel, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 199 days.

(21) Appl. No.: 14/852,928

(22) Filed: Sep. 14, 2015

(65) Prior Publication Data

US 2016/0074937 A1 Mar. 17, 2016

Related U.S. Application Data

(60) Provisional application No. 62/051,174, filed on Sep. 16, 2014.

(51) Int. Cl.
*B22F 3/105* (2006.01)
*B29C 67/00* (2017.01)
(Continued)

(52) U.S. Cl.
CPC ........ *B22F 3/1055* (2013.01); *B29C 67/0077* (2013.01); *B22F 2003/1057* (2013.01);
(Continued)

(58) Field of Classification Search
None
See application file for complete search history.

(56) References Cited

U.S. PATENT DOCUMENTS 5,038,014 A 8/1991 Pratt et al.
5,594,652 A 1/1997 Penn et al.
(Continued)

OTHER PUBLICATIONS

International Search Report issued in Application No. PCT/US2015/049482 dated Dec. 18, 2015.
(Continued)

*Primary Examiner* — Colleen P Dunn
*Assistant Examiner* — Rajinder Bajwa
(74) *Attorney, Agent, or Firm* — McDermott Will & Emery LLP

(57) ABSTRACT

A method for manufacturing material voxel-by-voxel using directed-energy deposition is given. Using the method, unsupported structures, via voxel-wise directed-energy deposition, with steep overhangs is described and demonstrated. Methods for forming arbitrarily-complex structures and shaped voxels and surfaces are also given. A method for forming materials with internally-varying properties is also given. The method utilizes a pulsed or modulated, rather than continuous-wave energy source, thus allowing rapid solidification of voxels, rather than contours, hatches or tracks. Tuning of pulsing or modulation, material flow, and deposition-path parameters allows the buildup of unsupported material using standard directed-energy deposition processing heads and 3-axis stages, for example. The methods are demonstrated using a modified-directed-energy-deposition processes and is applicable to powder-bed for the buildup of three-dimensional components, repair and the addition of features to existing components.

11 Claims, 6 Drawing Sheets

(51) Int. Cl.
  *B33Y 10/00*   (2015.01)
  *B33Y 30/00*   (2015.01)
  *B33Y 50/02*   (2015.01)

(52) U.S. Cl.
  CPC ............... *B33Y 10/00* (2014.12); *B33Y 30/00* (2014.12); *B33Y 50/02* (2014.12); *Y02P 10/295* (2015.11)

(56) References Cited

U.S. PATENT DOCUMENTS

| | | | |
|---|---|---|---|
| 5,837,960 A | 11/1998 | Lewis et al. | |
| 6,410,105 B1 | 6/2002 | Mazumder et al. | |
| 6,724,783 B2 | 4/2004 | Jalali et al. | |
| 6,811,744 B2 | 11/2004 | Keicher et al. | |
| 6,814,823 B1 | 11/2004 | White | |
| 7,206,654 B2 | 4/2007 | Silverbrook | |
| 7,597,420 B2 | 10/2009 | Silverbrook | |
| 2001/0002287 A1* | 5/2001 | Kar | B22F 3/1055 427/554 |
| 2006/0003095 A1* | 1/2006 | Bullen | B22F 3/004 427/180 |
| 2014/0251481 A1 | 9/2014 | Kroll et al. | |
| 2014/0305529 A1* | 10/2014 | Kroll | B29C 67/0077 138/111 |

OTHER PUBLICATIONS

Written Opinion issued in Application No. PCT/US2015/049482 dated Dec. 18, 2015.
"Standard Terminology for Additive Manufacturing Technologies", ASTM International, Designation F2792-12a, Jan. 3, 2013, 3 pages.

\* cited by examiner

METHOD FOR MANUFACTURING OVERHANGING MATERIAL BY PULSED, VOXEL-WISE BUILDUP

CROSS-REFERENCE TO RELATED APPLICATION

This application claims the benefit of U.S. Provisional Application No. 62/051,174 filed Sep. 16, 2014 the entire disclosure of which is hereby incorporated by reference herein.

STATEMENT REGARDING FEDERALLY SPONSORED RESEARCH

This invention was made with government support under Contract No. N00014-11-1-0668, awarded by the Office of Naval Research. The Government has certain rights in the invention.

TECHNICAL FIELD

The present disclosure relates to additive manufacturing and in particular, additive manufacture of overhangs.

BACKGROUND

High-melting point components, such as metals and ceramics, can be built using additive manufacturing (AM) using one of two methods: powder bed fusion (PBF) or directed energy deposition (DED). In the former, a laser or electron beam is scanned over a bed of powder; while in the later, powder is blown or wire is fed into the melt pool formed by a laser or electron beam or electric arc or gas arc source. In all cases, parts are typically built up layer-by-layer to form three-dimensional components. See ASTM F2792-12a F42 Committee, "Standard Terminology for Additive Manufacturing Technologies," ASTM International, 2012. Current techniques allow for deposition via layer-by-layer or successive laser raster passes (hatch-by-hatch). Layer-by-layer and hatch-by-hatch processes are limited in their ability to deposit overhanging structures, control part microstructure, control part properties, and control surface structure and features.

Deposition of overhanging structures is a critical problem in metals-based additive manufacturing. Currently, directed-energy and powder bed additive manufacturing processes have limited capability to deposit overhangs. One approach for depositing a slightly-overhanging structure, with an overhang angle of about 60 degrees is to partially overlay successive cross sections of a component or utilize greater-than-3-axis stage arrangements to tilt the substrate or deposition head during processing. For example, U.S. Pat. No. 6,811,744 B2 discloses methods and apparatus for deposition of 3D parts though directed material deposition slice-by-slice. It also addresses methods for control of the thermal history and properties of the deposited parts. It also includes representations (FIG. 27, 28, 28a, 29) for deposition of overhanging structures. Several preferred methods for production of overhanging structures are addressed. One method allows the motion of a focused laser beam an off-set distance ($\Delta x$) (typically less than ½ of the beam spot size) away from the edge of a previously-deposited layer prior to deposition. Next, a contour is deposited along the off-set distance, creating a "slight overhang". It is claimed that repetition of the process multiple times on a single layer can result in an overhang angle of approximately 60 degrees.

The '744 patent describes the overhang angle as the angle defined by the horizontal (x) axis and the vector connecting the edge of the current and previously deposited layers. After deposition of the overhang, additional depositions beads (line segments) are used to fill in a complete layer. The use of multi-axis stages to reorient the part with respect to the deposition beam is also provided.

US Patent Publication No. 20060003095A1 is a continuation-in-part of U.S. Pat. No. 6,811,744 B2 and discloses that the laser beam off-set distance ($\Delta x$) be kept small with respect to the bead diameter. It also discloses methods for the use of specially-configured powder nozzles and multi-axis stages to reorient the part with respect to the deposition beam. The method is preferably implemented by sequential deposition of part cross-sections, layer-by-layer, and allows for the deposition of support structures using lower laser power than the component material followed by removal of the support structure though mechanical means.

Several other approaches for deposition of overhang angles are known. For example, U.S. Pat. No. 5,038,014 describes a method for the formation of components by successive deposition of cross-sectional layers. Each layer includes a number of beads—deposition line segments—spaced and orientation with respect to beads on a previous layer. It is stated that the formation of overhangs requires that a layer must at least partially overlap its underlying layer. However, no further disclosure is provided for the deposition of overhangs.

U.S. Pat. No. 6,410,105 B1 discloses a method for deposition of overhangs, based on deposition of a sacrificial material. The processes requires that the sacrificial material be of a lower melting point than the component material and requires removal of the sacrificial material though melting in a high-temperature furnace.

Additional patents related to voxel printing include U.S. Pat. No. 7,597,420 B2, U.S. Pat. No. 7,206,654 B2, U.S. Pat. No. 6,814,823 B1, U.S. Pat. No. 5,594,652 A. U.S. Pat. No. 7,597,420 B2 and U.S. Pat. No. 7,206,654 B2 relate to multiple, preferably Micro Electro Mechanical, print heads and do not relate to DED or PBF processes or the generation of overhangs. U.S. Pat. No. 6,814,823 B1 relates to a method for ultrasonic welding, with electrical resistance and frictional methods as alternatives, for 3D object fabrication and does not relate to DED or PBF processes or the generation of overhangs. U.S. Pat. No. 5,594,652 relates to a method for dispensing a layer of liquid material onto a platform and does not relate to DED or PBF processes or the generation of overhangs.

A need still exists for methods and systems that can manufacture overhangs, particularly steep overhangs, i.e., overhangs having an angle of or less than 30 degrees, and without the need for specially-designed nozzles or tilt-table arrangements.

SUMMARY OF THE DISCLOSURE

An advantage of the present disclosure is the facile manufacture of overhangs with additive manufacturing. These and other advantages are satisfied, at least in part, by a method of forming an overhang on a target comprising: directing a flow of material, e.g., a powder or wire flow, and a pulsed or modulated energy source at a surface of a target to form a melt pool; and translating the material flow and energy source relative to the target along an overhang vector to produced overlapping voxels along the overhang vector and form an overhang on the target. Advantageously, the energy source can be pulsed or modulated laser beam, or other energy source such as an electron beam, electric arc or gas arc. The purpose of the energy source is to generate heat at the target which melts the material to create a melt pool.

Embodiments include one or more of the following features individually or combined. For example, the method can include translating the material flow, e.g., a powder or wire, and an energy source relative to the target along an overhang vector can involve moving both the energy source and target. In some embodiments, the material flow and energy source and target are translated in X-Y-Z space along an overhang vector and the overhang vector is oriented along an angle with respect to the X-Y plane. In other embodiments, the method can include coordinating translation of the target and directing of the material flow along an overhang vector with an overhang angle. The overhang angle can be less than 90°, e.g., less than 75°, 60°, 55°, 45°, and less than 35 degrees. In still further embodiments, the method includes directing a material in the form of a powder or wire in which the powder or wire includes nickel, iron, cobalt, titanium based alloys, refractory metals or cermets (ceramic-metal composites), for example.

Another aspect of the present disclosure includes a system for depositing material on a target. The system includes an energy source, most commonly a laser beam, for processing a material on the target, one or more feedstock delivery systems, i.e., nozzles or wire feeders, disposed around the laser beam for directing a material flow to the target, and a positioning system for translating the target relative to the energy source and the one or more nozzles or wire feeders, wherein the energy source is configured to be pulsed or modulated when material from the one or more nozzles or wire feeders is directed to the target. In addition to a laser beam, the energy source can be an electron beam, electric arc, or gas arc.

Embodiments include one or more of the following features individually or combined. For example, the system can include a positioning system comprises a three-axis stage arrangement to position and translate the target with respect to the energy source and the one or more feedstock delivery systems, e.g., nozzles or wire feeders. The one or more feedstock delivery systems and energy source can be arranged in a processing or deposition head. In some embodiments, the positioning system is configured to coordinate translation of the target with respect to the energy source and the one or more feedstock delivery systems along an overhang vector with an overhang angle. The overhang angle can be less than 90°, e.g., less than 75°, 60°, 55°, 45°, and less than 35 degrees. In other embodiments, stage motion, energy source power, and material flow are controlled and coordinated using Numerical Control (NC) software and hardware. In still further embodiments, the system includes a motion controller or signal outputting device configured to coordinate motion of all axes along with timing and parameters of energy source power and material flow rate. In various embodiments, the system includes an arbitrary waveform generator to control pulsing or modulating the energy source. In some embodiments, the system includes one or more nozzles as the one or more feedstock delivery systems and the one or more nozzles are configured to direct a powder flow and the energy source is a laser beam. The system can have a translational speed of 0.1 mm/s to 10 mm/s; a square wave with peak power of between 100 W and 25000 W, a period of 1 ms to 1000 ms, a 10 to 90% duty cycle, and a power flow of 0.1 cc/min to 10000 cc/min.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Figure 1:
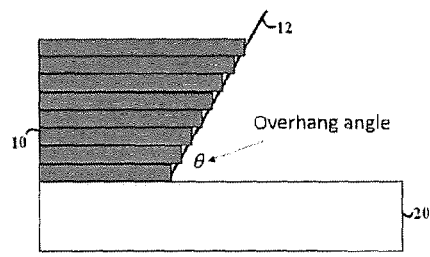
FIG. 1 illustrates a definition of an overhang angle.

The present disclosure relates to voxel-based additive manufacture of overhangs and systems therefor. The methods and systems of the present disclosure can be applied to powder bed deposition processes and to directed energy deposition processes and can be used to manufacture new structures or repair pre-existing structures. Advantageously, voxels can be deposited to first generate overhangs according to the present disclosure, followed by deposition of continuous hatches to fill an interior. Voxels deposition of the present disclosure can also be coupled with conventional deposition of structures to create structured surfaces or custom surface finish. FIG. 1 illustrates the definition of an overhang angle as used herein. As shown in the figure, overhanging structure 10 on target 20 forms overhang angle (θ), which is determined between a tangent 12 along overhang structure 10 and target 20.

In one aspect of the present disclosure, a system for depositing material on a target is disclosed. The system comprises an energy source, such as a laser beam, electron beam, electric arc, or gas arc, for processing the material on the target and one or more feedstock delivery systems, e.g., nozzles or wire feeders, disposed around the energy source for directing a flow of material to the target. The material can be in the form of a powder or wire. A positioning system is used to translate the target relative to the laser beam and material flow. For example, a three-axis stage arrangement can be used to position and translate the target with respect to the energy source, e.g., laser beam, and material flow, e.g., powder flow. The position and translation of the target can alternatively be accomplished by single-axis stages, multi-axis stages, robots, etc. or any of the foregoing in combination.

Advantageously, the energy source is configured to be pulsed or modulated when material from the one or more nozzles are directed to the target. Pulsing or modulating the energy source causes heating and cooling of the melt pool. It is believed that cooling of the melt pool during the energy off cycle of the energy source allows solidification of the melt pool which in turn allows formation of steep overhanging structures. It was found that using a continuous energy source does not allow formation of such overhanging structures.

In an aspect of the present disclosure, stage motion, laser beam power, and material flow are controlled and coordinated using Numerical Control (NC) software and hardware. Such hardware includes a digital computer which contains code for CAD geometric representations of the part to be built and a representation of voxel or subvolume patterns required for part buildup. A motion controller or signal outputting device is used to coordinate motion of all axes along with timing and parameters of energy source power and material flow rate. In an embodiment of the present disclosure, the motion controller or signal outputting device is used to coordinate motion of all axes along with timing and parameters of laser beam power and powder flow rate.

In normal operation, the system of the present disclosure dispenses and fuses material, e.g., metal powders, in patterns preferably dictated by three-dimensional CAD models. Guided by computerized blueprints, the system creates material structures by depositing them, preferably one voxel or subvolume at a time. The system can include a laser, such as a high-powered Nd:YAG, Nd-doped fiber, $CO_2$, excimer, or diode laser as the energy source, to strike a target and produce a molten pool. Through a deposition head, one or more nozzles then preferably direct a precise amount of powdered material into the pool to increase the material volume. A voxel or subvolume is built to the CAD geometric specifications as the positioning system translates the target relative to the energy source, e.g., as the positioning system moves the target to positions under the laser beam in X-Y-Z space. For example, during voxel or subvolume buildup, the deposition head moves in the Z direction in coordination with the target translation in the X-Y plane, such that the energy focusing and material flow geometries remain at a constant working distance from the melt pool. The energy focusing and material-deposition process repeats until all voxels or subvolumes are deposited. The standard mode of operation includes 3 axes of motion, computer control, a controlled atmosphere chamber, one energy source, e.g., a laser beam, a standard powder deposition head with a primary powder line, and a target.

Parts or other depositions which are produced with the system often incorporate overhangs, defined as any deposited structure, edge, area, or portion of a deposited structure, which extends laterally from an existing structure without substantial support underneath it. Overhangs can occur in cavities within a structure, among other locations. Overhangs can be manufactured according to the present disclosure by directing a powder and a pulsed or modulated laser beam at a surface of a target to form a melt pool.

In practicing an aspect of the present disclosure, an overhang structure can be manufactured by directing a material and a pulsed or modulated energy beam at a surface of a target to form a melt pool. The target and deposition head are translated in X-Y-Z space along an overhang vector. The overhang vector is oriented along an angle with respect to the X-Y plane. A 90° overhang is normal to the X-Y plane and results in vertical build up with no overhanging structure. Overhang structures with an overhang angle less than 90° can be formed by sequential voxel-by-voxel deposition along the overhang vector. Each voxel is formed by material flow into the melt pool formed by one pulse or modulation of the energy source directed at the target. Rapid solidification coupled with surface tension forces enable overhanging molten material to completely or partially solidify before dripping or loosing form due to gravity. Preferably, pulsing or modulation parameters are selected according to the material properties of the deposited material such that pulsing parameters are sufficient to form a liquid melt pool followed by partial or complete solidification of the melt pool during each pulse or modulation period. For example, overhanging structures composed of stainless steel or titanium can be deposited using comparable translation speeds (0.42 mm/s), laser pulse shapes (square pulse with 100 ms pulse period and a duty cycle of 50%), and powder volume flow (0.7 cc/min), but stainless steel is preferably deposited using a lower maximum (peak) power (350 Watts) than titanium (450 Watts) owing to stainless steel's lower melting point. Additional pulsing parameters include a translational speed of 0.1 mm/s to 10 mm/s; a square wave with peak power of between 100 W and 25000 W, e.g. 450 W, a period of 1 ms to 1000 ms, e.g., 100 ms and a 10 to 90% duty cycle, such as a 50% duty cycle; a power flow of 0.1 cc/min to 10000 cc/min. The energy source power and spot size can be changed within a large range (for example, laser power up around 12 kW is common and the beam spot size may range from microns to centimeters). The energy source and spot size can be adjusted to produce large and small voxels. Adjusting the energy source and spot size parameters enables creation of fine features, which is advantageous in producing medical devices. As explained earlier, it is believed that that pulsing should occur such that a voxel forms, remains spherical or semi-spherical while the beam is on, then freezes quickly in place.

Material flow can be constant, modulated or pulsed, and can be delivered by one or more feedstock delivery systems, such as nozzles or wire feeders, aimed at the melt pool. Further, the composition of the material flow can be altered during deposition to produce overhangs with different compositions. Preferably, the material flow coincides approximately with the size of laser spot size at the surface of the buildup and is coaxially-oriented with respect to the laser beam. Preferably, the energy source, e.g., laser beam, is normal to the surface of the build plate or platform.

A wide variety of powders can be used with the methods and apparatuses of the present disclosure including, for example, nickel, iron, cobalt, and titanium based alloys, as well as refractory metals and cermets (ceramic-metal composites). Composite materials include, for example, a nickel/cobalt matrix filled with tungsten carbide or titanium carbide particles.

Wire having the same compositions can also be used in place of powder. However, the use of a wire as a form for a material flow is less preferable.

Overhang structures with an overhang angle less than 90°, e.g., less than 75°, 60°, 55°, 45°, and even less than 35°, can be prepared according to methods of the present disclosure by coordinated translation of the target and deposition head along an overhang vector with an overhang angle of less than 90°, e.g., less than 75°, 60°, 55°, 45°, and 35 degrees. In an embodiment of the present disclosure, steep overhangs, i.e., overhangs having an angle of at or less than 30 degrees, can be deposited with a 3-axis stage or equivalent and without specially-designed nozzles or tilt-table arrangements. Such overhangs can be manufactured by coordinated translation of the target and deposition head along an overhang vector with an overhang angle of 30 degrees or less. Voxel-by-voxel deposition along the overhang vector results in a solidified overhanging structure with an overhang angle of 30 degrees or less. By this process more complex structures can be fabricated than what is believed reported in the patent literature to date.

In another aspect of the present disclosure, a method for the voxel-wise deposition of material using directed energy deposition (DED) includes a pulsed or modulated energy source forming a melt pool into which material is introduced. Material flow, powder flow, can be constant, modulated or pulsed, or the composition changed and can be delivered by one or more feedstock delivery systems, such as nozzles or wire feeders, aimed at the melt pool. Material flow can contain one or multiple material compositions.

Figure 2:
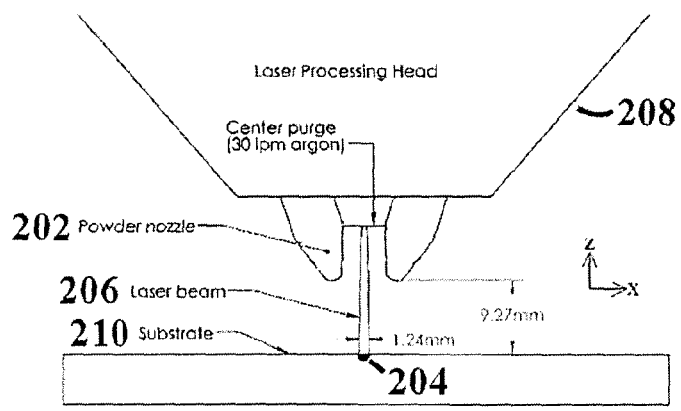
FIG. 2 illustrates deposition atop a substrate in accordance with the present disclosure.

FIG. 2 illustrates a DED system in accordance with an embodiment of the present disclosure. The figure shows use of four axis-symmetric powder nozzles (202, only two of which are illustrated) aimed at a melt pool (204) on substrate (210) formed by a laser beam (206) exiting the laser processing head (208). Preferably, powder flow coincides approximately with the size of laser spot size at the surface of the buildup and is coaxially-oriented with respect to the laser beam. Preferably, the laser beam is normal to the surface of the build plate or platform. In FIG. 2, the width of the laser beam is 1.24 mm and the distance of the powder nozzle from the substrate is 9.27 mm.

Figure 3:
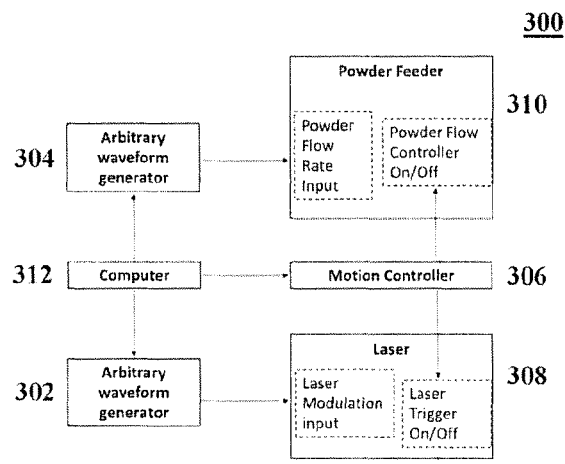
FIG. 3 illustrates a method for control of laser modulation or pulsing parameters and powder feed rate parameters according to an embodiment of the present disclosure.

Voxel-wise melt pool formation is controlled by a laser pulsing or modulation parameter. As shown in FIG. 3, preferably, laser pulsing or modulation parameters, including peak power, rise time, fall time, pulse profile, average power, extinction ratio, pulse duration, and duty cycle are controlled using an arbitrary waveform generator (302). Preferably, powder flow rate is also controlled using an arbitrary waveform generator (304). In some cases, the arbitrary waveform generators controlling laser parameter and powder flow may be embedded into the motion controller (306). Pulsing and modulation signals may also be embedded into the laser and powder flow systems (308, 310), respectively. For example, in an embodiment of the present disclosure, the laser power is set to 450 watts for 50 ms followed by 0 watts for the next 50 ms using a repeating programmed thread running on a Galil DMC 1800 series motion controller. A second programmed thread running on the Galil DMC 1800 series motion controller directs the motion of the X-Y-Z translation of the laser beam and powder flow relative to the target. A separate analog motor is used to maintain a constant powder flow.

FIG. 3 shows the laser with an on/off trigger which configuration allows pulsing of the laser beam. In this embodiment, the beam power can be pulsed using the laser modulation input or the laser trigger on/off. The modulation can be used to modulate the power from one set point to another set point (for example to set a sinusoidal laser power or triangle-shaped power curve). The laser trigger can be used to switch the laser beam on or off. Either can be used to pulse the laser beam (generate square-shaped power output) but only the modulation can be used to produce arbitrary output power shapes.

Computer 312 can coordinate and/or control motion controller and powder flow and arbitrary waveform generator 304 and laser arbitrary waveform generator 302. The motion controller may also include an internal computer or hardware capable of emulating or controlling some or all system components. For example, the motion controller may be capable of outputting arbitrary wave forms and of controlling powder flow rate inputs, laser beam modulation, and laser trigger.

Rapid solidification of the melt pool, due to beam pulsing or modulation, results in the formation of a solidified or partially-solidified voxel of material. The size and geometry of the voxel can be controlled via beam flux, beam geometry, beam pulsing or modulation parameters, X-Y-Z translation speeds and directions, and powder flow characteristics. While FIGS. 2 and 3 are illustrated with the use of a laser beam for the energy source and powder flow for the material flow, other energy sources and material flow forms can be used configured for use in the schemes.

Overlaying of voxels using a predefined pattern results in 3D structures. Due to the rapid solidification and surface tension of rapidly-solidifying, molten material, overhangs greater than the state-of-the-art can be deposited without the need for a stage with greater than 3-axes or specially-designed powder deliver nozzle arrangements. To form a continuous structure, voxels must be at least partially overlapping. Preferably, a full material bond, e.g., a metallurgical bond, is achieved between a deposited voxel and a prior-deposited voxel though partial melting of an underlying or neighboring voxel. Voxel deposition pattern can be selected or optimized based on desired geometry, microstructure or properties.

The overhang angle is most significantly determined by the position of a voxel to a previously-deposited voxel and translation in X-Y-Z space during voxel deposition. Voxel position is controlled by the position of the deposition head with respect to the target. Deposition of overhangs requires partial overlap of sequential voxels and can be accomplished via coordinated motion of the deposition head and target along an overhang vector. Overhang angles can be adjusted by adjusting the orientation and position of the overhang vector and the position of a voxel with respect to a previously-deposited voxel. Final overhang angle is determined by the relative position of solidified voxels.

A method for voxel shaping is also given. Motion of the energy source, e.g., laser beam, with respect to substrate or prior-deposited voxels can be used during voxel deposition to impart momentum or fluid-flow forces within the solidifying melt pool, allowing voxel shaping. Motion need not be constant and can be along any axis in 3-D space. Motion can be combined or replaced with modulation of material flow, e.g., powder flow, into the melt pool from one or multiple powder-delivery nozzles. For example, by introducing an asymmetric on non-axisymmetric flow of powder into the melt pool. Motion can also be combined or replaced with laser pulsing or modulation parameters to shape voxels. Other means of shaping the solidifying melt voxels include, but are not limited to, gas jets, secondary energy sources (e.g. laser beam or electron beam), and electromagnetic fields. Voxel shaping can be used to control voxel contact angle and geometry. Applications include the formation of structured surfaces and structured volumes. Voxel shapes and patterns may be selected or optimized based on desired geometry, microstructure or properties.

A method for forming materials with internally-varying microstructure or properties is also provided. Internally-varying structures can be formed via control of the size, geometry, and/or cooling rate of individual voxels. Voxel overlap can be used to control internal or external part porosity. The density of individual or overlapping voxels can be controlled via beam flux, beam geometry, beam pulsing or modulation parameters, X-Y-Z translation speeds and directions, and material flow, e.g., powder flow or wire feeding, characteristics.

Figure 6:
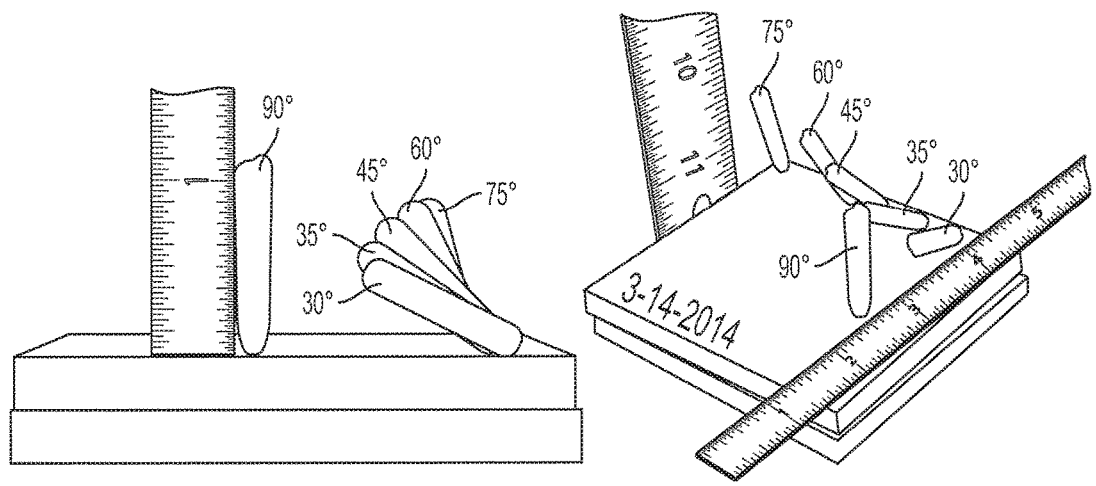
FIG. 6 is a picture showing overhanging structures deposited according to an embodiment of the present disclosure.
Figure 7:
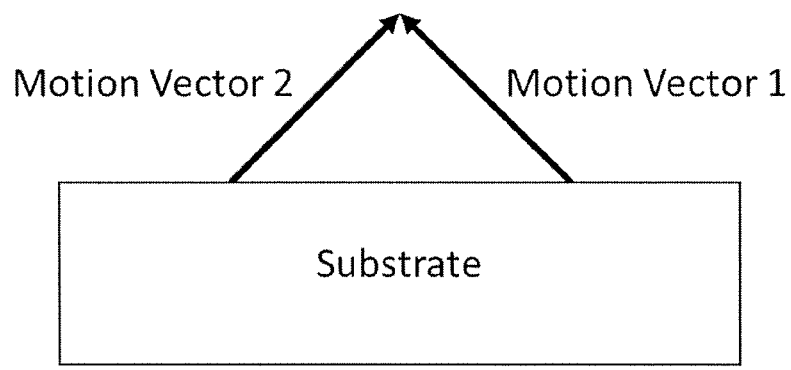
FIG. 7 illustrates motion vectors defining a 3-D structure deposition of overhangs according to an embodiment of the present disclosure.
Figure 8:
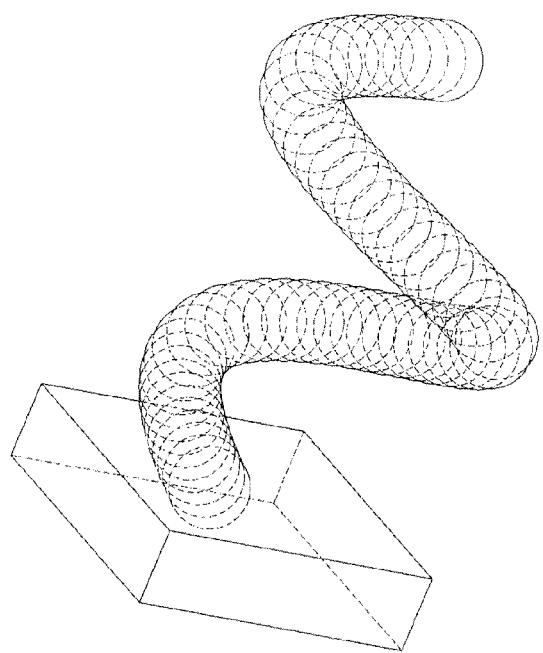
FIG. 8 illustrates a voxels deposited along arbitrary vectors forming curves in 3-D space according to an embodiment of the present disclosure.

As provided in the examples and FIGS. 6-12, a variety of overhanging structures can be deposited with the methods of the present disclosure. In addition to the structures exemplified in the examples below, more complex structures can be manufactured in accordance with embodiments of the present disclosure. For example, and as shown in FIG. 8, voxels can be deposited along arbitrary curves in 3-D space according to an embodiment of the present disclosure. The structure can be deposited by coordinated translation of the target and deposition head in X-Y-Z space. Translation can be point-to-point, such that the translation speed during each voxel deposition is zero, or continuous, such that the translation speed during each voxel deposition is greater than zero. Sequential, partially-overlapping voxels are formed by the flow of powder into a rapidly-solidifying melt pool formed by a pulsed or modulated laser beam.

Figure 9:
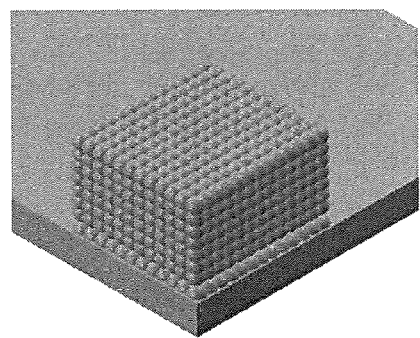
FIG. 9 illustrates voxels overlapped to create full-dense solids according to an embodiment of the present disclosure.

FIG. 9 illustrates a series of voxels overlapped to create full-dense solids according to an embodiment of the present disclosure. A fully-dense solid can be deposited by sequential, partial-overlap of voxels using the described method. Voxels can be deposited in any order and need not be deposited sequentially along X-Y planes. Preferably, voxel order and shape is defined based on a CAD geometry or part blueprint. A fully-dense solid is formed by overlapping voxels such that neighboring and underlying voxels are partially re-melted. Preferably, the volume of all melted and solidified material equals the total volume of the part defined within a CAD geometric specification or blueprint.

Figure 10:
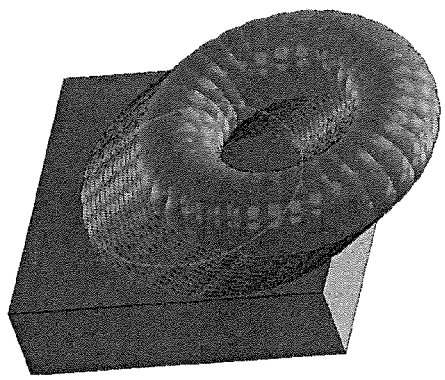
FIG. 10 illustrates a voxel-wise deposition allowing buildup of complex, overhanging structures according to an embodiment of the present disclosure.

FIG. 10 illustrates a voxel-wise deposition allowing buildup of complex, overhanging structures according to an embodiment of the present disclosure. The structure can be made by sequential overlap of voxels using sequential, partial-overlap using the described method. During voxel deposition, the target moves in coordinated motion with the deposition head, such that voxels are sequentially-deposited along pre-prescribed vectors forming a curve in X-Y-Z space. The curve may be represented by a helix oriented in X-Y-Z space. Alternatively the part can be formed by voxel deposition along closed curves on X-Y cross-sectional planes to form sequential layers, such that the laser deposition head remains stationary during deposition of each layer. After each layer, the deposition head translates a predefined layer height with respect to the target and the next layer can be deposited to form a 3-D structure. Another alternative by which the structure can be made is by partially-overlapping a series of overhang vectors, positioned along the target and oriented at varying overhang angles to the X-Y plane, using the described method.

Figure 11:
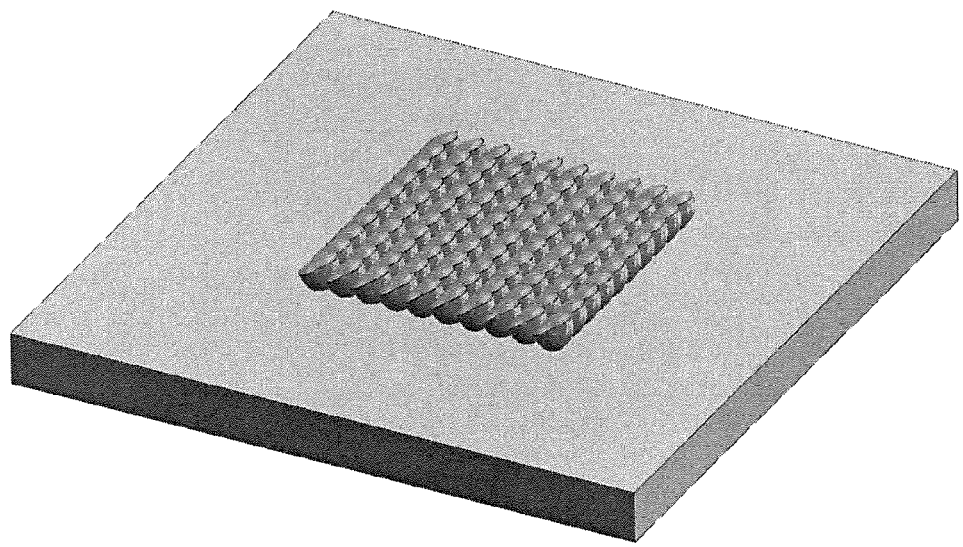
FIG. 11 illustrates a shaped voxel deposition enabling deposition of structured surfaces according to an embodiment of the present disclosure.

FIG. 11 illustrates a shaped voxel deposition enabling deposition of structured surfaces according to an embodiment of the present disclosure. Shaped voxels can be made by the coordinated translation and acceleration of the target and deposition head during voxel deposition. Preferably, translation and acceleration are coordinated with beam pulsing or modulation such that momentum forces are imparted to a partially-molten and rapidly-solidifying melt pool. Shaped voxel can also be made through non-axisymmetric powder flow into the melt pool or non-uniform laser beam flux or geometry. Partially-overlapping of shaped voxels forms a part with a structured surface.

Figure 12:
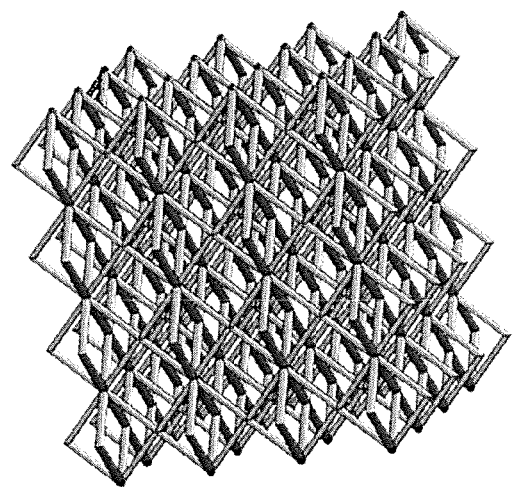
FIG. 12 illustrates a voxel-wise deposition allowing buildup of complex, cellular structures according to an embodiment of the present disclosure.

FIG. 12 illustrates a voxel-wise deposition allowing buildup of complex, cellular structures according to an embodiment of the present disclosure. The structure can be made by sequential overlap of voxels using sequential, partial-overlap using the described method. During voxel deposition, the target moves in coordinated motion with the deposition head, such that voxels are sequentially-deposited along pre-prescribed vectors in X-Y-Z space. The vectors may be represented by multiple point-to-point translations, such that the translation speed during each voxel deposition is zero, or continuous, such that the translation speed during each voxel deposition is greater than zero. Sequential, partially-overlapping voxels are formed by the flow of powder into a rapidly-solidifying melt pool formed by a pulsed or modulated laser beam. Alternatively, the structure can be made by partially-overlapping a series of overhang vectors, positioned along the target and oriented at varying overhang angles to the X-Y plane, using the described method.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Example 1

A DED, laser-based system was used for deposition. The system was equipped with a 500 watt, Ytterbium-doped fiber laser with a beam spot size of 1.24 mm at the working distance, which corresponded to a space of 9.27 mm between the substrate and four, radially-symmetrically powder-delivery nozzles. Centered among the powder nozzles was a coaxial, center-purge nozzle, though which 30 lpm of argon flowed.

Titanium—6% aluminum—4% vanadium alloy structures were deposited atop a titanium—6% aluminum—4% vanadium alloy substrate. Extra low interstitials (ELI)-grade powder with a mean particle distribution between 50 and 150 microns was used for deposition. During deposition, oxygen concentration was maintained below 20 parts per million within the processing chamber. The chamber held an argon atmosphere at a gauge pressure between 2 and 3 inches of water. The pressure was maintained using a pressure regulator along with inlet flows of argon from the coaxial purge nozzle and the powder-delivery nozzles. Powder flow was measured and maintained at 3 grams per minute using a powder feeder assisted by a 4 lpm argon flow. Powder flow rate was constant.

Figure 4:
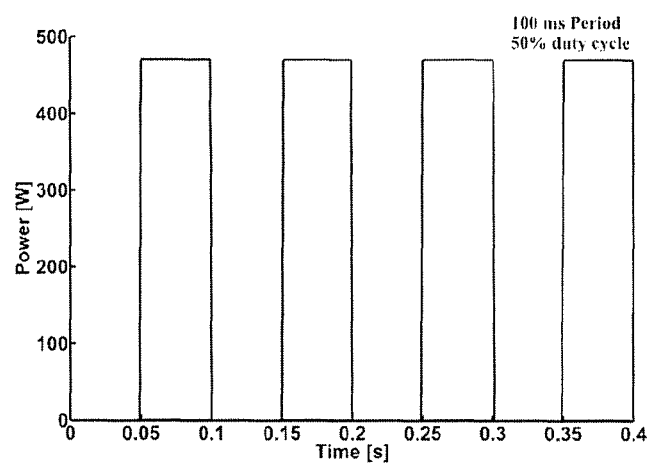
FIG. 4 is a chart illustrating a laser power in pulsed mode according to an embodiment of the present disclosure.
Figure 5:
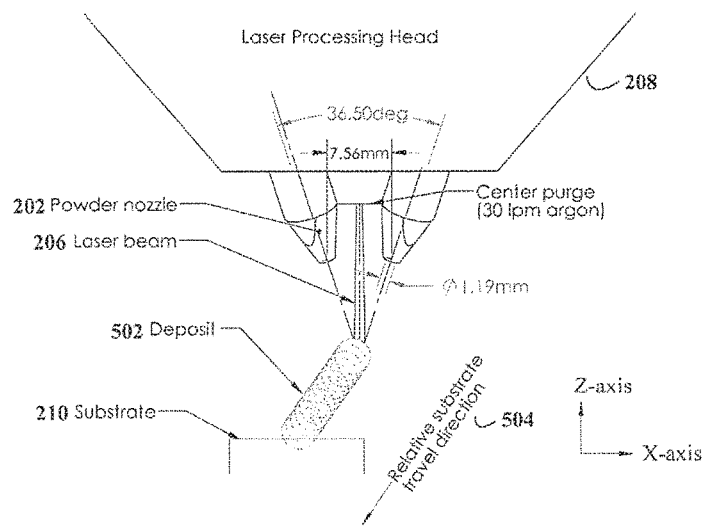
FIG. 5 illustrates a voxel-wise deposition of an overhang according to an embodiment of the present disclosure.

Laser beam power was controlled using an analog, pulsed signal. The laser power was modulated to produce periodic, square waves with a maximum power of 450 W, period of 100 ms, and a duty cycle of 50%, as shown in FIG. 4. During deposition, a constant speed of 0.42 mm/s was used. Motion was defined as by a vector in X-Z space. The vector was oriented at angles between 30 and 90 degrees with respect the X-axis, as shown in FIG. 5. FIG. 5 illustrates a DED system using four axis-symmetric powder nozzles (202, only two of which are illustrated) each with an exit hole diameter (Ø) of 1.19 mm aimed at deposit (502) on substrate (210) formed by a laser beam (206) exiting the laser processing head (208). Element 504 defines the vector of relative substrate travel direction. Overhanging structures deposited using the described procedures are shown in FIG. 6. One non-overhanging (90 degree) and five overhanging structures (75 degree, 60 degree, 45 degree, 35 degree, and 30 degree) deposited using the described procedure are shown.

Overhanging structures were formed by the coordinated translation of the target and deposition head along an overhang vector. For example, the 30 degree overhanging structure was deposited by coordinated motion of the target a distance of 22 mm along the negative X-axis and the laser deposition head a distance of 12.7 mm along the positive Z axis. The coordinated motion resulted in a combined motion of both target and deposition head at a speed (Sqrt(X-axis speed)^2+(Z-axis speed)^2) of 0.42 mm/s. During the coordinated translation of both target and deposition head, laser beam pulsing produced overlapping voxels along the overhang vector.

As another example, the 75 degree overhanging structure was deposited in a similar fashion to the 30 degree overhanging structure except that the target moved along the negative X-axis a distance of 6.57 mm and the deposition head moved along the Z-axis a distance of 24.53 mm during sequential-voxel depositions.

Example 2

A DED, Laser-based system was used for deposition as described in Example 1.

Laser beam power was controlled using an analog, pulsed signal. The laser power was modulated to produce periodic, square waves with a maximum power of 450 W, period of 100 ms, and a duty cycle of 50%, as shown in FIG. 4. During deposition, a constant speed of 0.42 mm/s was used. Overlapping voxels were deposited along independent vectors in X-Z space, as shown in FIG. 7. Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A method of forming an overhang on a target, the method comprising:
   directing a material flow and a pulsed or modulated energy source at a surface of a target to form a melt pool; and
   translating the material flow and energy source in a Z direction relative to and in coordination with translating the target in an X-Y plane along an overhang vector forming an overhang angle of less than 90° wherein energy focusing and material flow geometries are at a constant working distance from the melt pool to produce overlapping voxels along the overhang vector and form an overhang on the target.

2. The method of claim 1, wherein translating the material flow and energy source relative to the target along an overhang vector involves moving both the energy source and target.

3. The method of claim 1, wherein the energy source is pulsed or modulated sufficient to form a liquid melt pool followed by a partial or complete solidification of the melt pool during each pulse or modulation period.

4. The method of claim 1, wherein the overhang vector forms an overhang angle of less than 55°.

5. The method of claim 1, comprising coordinating translation of the target and directing of the material flow along an overhang vector with an overhang angle of 45 degrees or less.

6. The method of claim 1, wherein the material flow is in the form of a powder and the energy source is a laser beam.

7. The method of claim 6, wherein the powder includes one or more of nickel, iron, cobalt, titanium based alloys, refractory metals or cermets.

8. The method of claim 1, comprising translating the material flow and energy source relative to the target along the overhang vector to form an overhang on the target having an overhang angle of less than 45 degrees.

9. The method of claim 1, further comprising controlling pulsing or modulating the energy source by an arbitrary waveform generator.

10. A method of forming an overhang on a target, the method comprising:
    directing a material flow and a pulsed or modulated energy source at a surface of a target to form a melt pool; and
    translating the material flow and energy source in a Z direction relative to and in coordination with translating the target in an X-Y plane along an overhang vector forming an overhang angle of less than 60° wherein energy focusing and material flow geometries are at a constant working distance from the melt pool to produce overlapping voxels along the overhang vector and form an overhang on the target.

11. The method of claim 10, further comprising controlling pulsing or modulating the energy source by an arbitrary waveform generator.

* * * * *